(12) United States Patent
Stamos

(10) Patent No.: US 9,083,727 B1
(45) Date of Patent: Jul. 14, 2015

(54) SECURING CLIENT CONNECTIONS

(75) Inventor: Alexander Charles Stamos, San Carlos, CA (US)

(73) Assignee: Artemis Internet Inc., San Francisco, CA (US)

( * ) Notice: Subject to any disclaimer, the term of this patent is extended or adjusted under 35 U.S.C. 154(b) by 552 days.

(21) Appl. No.: 13/444,225

(22) Filed: Apr. 11, 2012

(51) Int. Cl.
*G06F 21/00* (2013.01)
*H04L 29/06* (2006.01)
*H04L 9/32* (2006.01)

(52) U.S. Cl.
CPC ............... *H04L 63/126* (2013.01); *H04L 9/32* (2013.01)

(58) Field of Classification Search
CPC ........... G06F 21/31; H04L 9/32; H04L 63/12; H04L 63/126; H04L 63/0823
See application file for complete search history.

(56) References Cited

U.S. PATENT DOCUMENTS

| | | | |
|---|---|---|---|
| 7,451,488 B2 | 11/2008 | Cooper et al. | |
| 7,467,203 B2 | 12/2008 | Kang et al. | |
| 7,499,865 B2 | 3/2009 | Aggarwal et al. | |
| 7,792,994 B1 | 9/2010 | Hernacki | |
| 7,849,502 B1 | 12/2010 | Bloch et al. | |
| 7,849,507 B1 | 12/2010 | Bloch et al. | |
| 7,984,163 B2 | 7/2011 | Almog | |
| 8,261,351 B1 | 9/2012 | Thornwell et al. | |
| 8,347,100 B1* | 1/2013 | Thornewell et al. | 713/176 |
| 8,484,694 B2 | 7/2013 | Diebler et al. | |
| 2001/0052007 A1 | 12/2001 | Shigezumi | |
| 2004/0006706 A1 | 1/2004 | Erlingsson | |
| 2004/0030784 A1* | 2/2004 | Abdulhayoglu | 709/227 |
| 2004/0098485 A1* | 5/2004 | Larson et al. | 709/227 |
| 2004/0158720 A1* | 8/2004 | O'Brien | 713/176 |
| 2004/0193703 A1 | 9/2004 | Loewy et al. | |
| 2005/0015626 A1 | 1/2005 | Chasin | |
| 2005/0273841 A1* | 12/2005 | Freund | 726/1 |
| 2006/0021031 A1* | 1/2006 | Leahy et al. | 726/22 |
| 2006/0021050 A1 | 1/2006 | Cook et al. | |
| 2006/0041938 A1* | 2/2006 | Ali | 726/14 |
| 2006/0047798 A1 | 3/2006 | Feinleib et al. | |
| 2006/0167871 A1 | 7/2006 | Sorenson et al. | |
| 2006/0230380 A1 | 10/2006 | Holmes et al. | |
| 2007/0204040 A1 | 8/2007 | Cox | |
| 2007/0214283 A1 | 9/2007 | Metke et al. | |
| 2007/0214503 A1 | 9/2007 | Shulman et al. | |
| 2008/0059628 A1* | 3/2008 | Parkinson | 709/224 |
| 2008/0140441 A1* | 6/2008 | Warner | 705/1 |
| 2008/0147837 A1 | 6/2008 | Klein et al. | |
| 2008/0222694 A1 | 9/2008 | Nakae | |
| 2009/0037976 A1 | 2/2009 | Teo et al. | |
| 2009/0055929 A1 | 2/2009 | Lee et al. | |
| 2009/0164582 A1 | 6/2009 | Dasgupta et al. | |
| 2010/0049985 A1 | 2/2010 | Levow et al. | |
| 2010/0094981 A1 | 4/2010 | Cordray et al. | |
| 2010/0100957 A1 | 4/2010 | Graham et al. | |
| 2010/0125895 A1* | 5/2010 | Shull et al. | 726/4 |
| 2010/0131646 A1 | 5/2010 | Drako | |
| 2010/0191847 A1 | 7/2010 | Raleigh | |
| 2011/0010426 A1 | 1/2011 | Lalonde et al. | |
| 2011/0167474 A1 | 7/2011 | Sinha et al. | |
| 2011/0182291 A1 | 7/2011 | Li et al. | |

(Continued)

*Primary Examiner* — William Goodchild
(74) *Attorney, Agent, or Firm* — Van Pelt, Yi & James LLP

(57) ABSTRACT

An input including a second level domain is received. The second level domain is associated with a particular top level domain. A policy associated with the top level domain is obtained. A determination is made as to whether connection information is consistent with the policy. Content is displayed based on the determination.

20 Claims, 10 Drawing Sheets

(56) References Cited

U.S. PATENT DOCUMENTS

| | | |
|---|---|---|
| 2011/0247073 A1 | 10/2011 | Surasathian |
| 2011/0258237 A1 | 10/2011 | Thomas |
| 2011/0276804 A1* | 11/2011 | Anzai et al. .................. 713/176 |
| 2011/0314152 A1 | 12/2011 | Loder |
| 2012/0131164 A1 | 5/2012 | Bryan et al. |
| 2012/0203904 A1 | 8/2012 | Niemela et al. |
| 2012/0303808 A1 | 11/2012 | Xie |
| 2013/0007540 A1 | 1/2013 | Angelsmark et al. |
| 2013/0097699 A1* | 4/2013 | Balupari et al. ................ 726/22 |
| 2013/0239209 A1 | 9/2013 | Young et al. |
| 2013/0276053 A1 | 10/2013 | Hugard et al. |

\* cited by examiner

SECURING CLIENT CONNECTIONS

BACKGROUND OF THE INVENTION

Individuals are increasingly using the Internet to conduct financial and other sensitive transactions. For example, an individual might visit a bank website to check balance information or transfer money between accounts. Unfortunately, a variety of techniques are available to criminals and others with nefarious motives who wish to eavesdrop on or otherwise compromise the security that the individuals believe protect their transactions. As one example, unsuspecting users can be tricked into visiting a compromised or otherwise illegitimate copy of a legitimate website. As another example, the communications between the user and the legitimate website can be intercepted. Such communications can be intercepted even when protections such as TLS are employed, through the use of man-in-the-middle and other attacks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
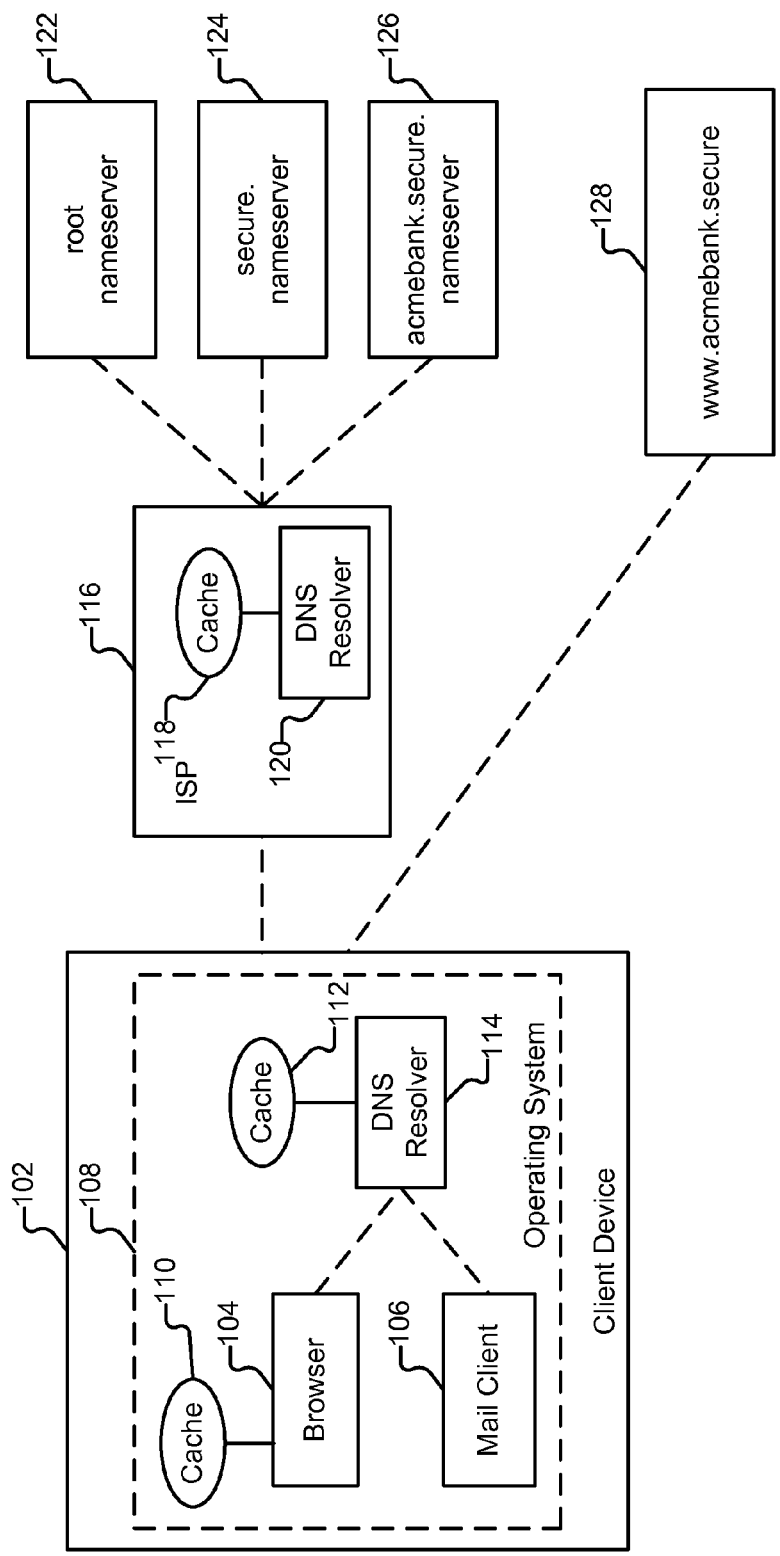
FIG. 1 illustrates an example of an environment in which client devices securely connect to network resources.

FIG. 1 illustrates an example of an environment in which client devices securely connect to network resources. As shown, client device 102 is a personal computer comprising typical commodity hardware (e.g., having a multi-core processor, RAM, storage, and one or more network interfaces) and running an operating system 108. Installed on client device 102 are applications such as a web browser application 104 and a mail client application 106. Other client devices can also be used in conjunction with the techniques described herein, such as mobile phones, tablets, game consoles, set-top boxes, etc.

Suppose a user of client device 102 (hereinafter "Alice") has a set of bank accounts with a financial institution known as "ACME Bank, Inc." ACME Bank has a website 128 accessible via the URI: www.acmebank.secure. The top level domain (TLD) of the site is ".secure." As will be described in more detail below, ACME Bank can also employ domains with other top level labels, such as "www.acmebank.com," "www.acmebank.safe," and/or "www.acmebank.bank" and can also redirect users to www.acmebank.secure from those domains if desired.

Figure 2:
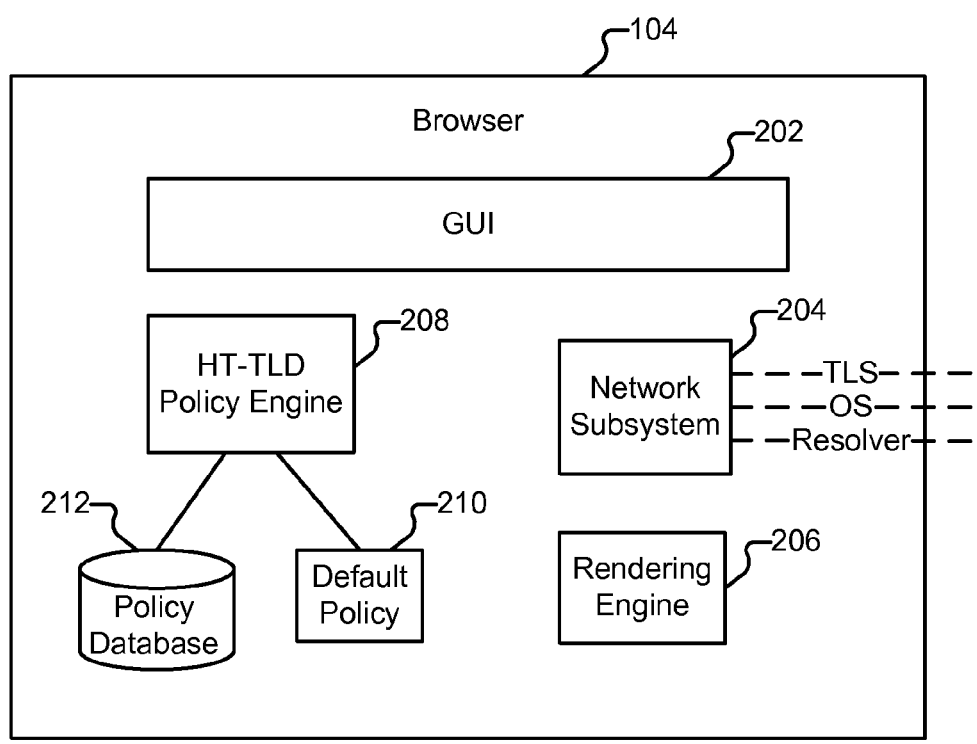
FIG. 2 illustrates various logical components of an embodiment of a browser application.

FIG. 2 illustrates various logical components of an embodiment of a browser application. When Alice wishes to connect to ACME Bank's website to check the balance in one of her accounts, she loads browser application 104 and types "www.acmebank.secure" into the browser's address bar.

In some embodiments browser 104 has a Domain Name System (DNS) cache 110. If the resolution of www.acmebank.secure to an IP address is not present in cache 110, browser 104 connects with DNS resolver 114 provided by operating system 108 (e.g., via network subsystem 204). DNS resolver 114 has its own cache 112. If the resolution is not present in cache 112, DNS resolver 114 contacts the DNS resolver 120 of client 102's ISP 116. DNS resolver 120 has its own cache 118 and also a hints file usable to identify root nameservers such as root nameserver 122. If the resolution is not present in cache 118, DNS resolver 120 will iteratively query nameservers 122-126 until it ultimately receives an answer that includes an IP address for site 128. In various embodiments, each of the responses provided by each of the nameservers (whether a referral to another nameserver or the IP address) is DNSSEC signed. As shown, nameserver 124 is authoritative for the ".secure" TLD, and nameserver 126 is authoritative for the second level domain "acmebank.secure." In various embodiments, caches 118, 112, and 110 are configured to cache the results of the DNS queries.

Included in browser 104 is a policy engine 208 that determines whether the TLD (e.g., ".secure") of the site to which Alice is attempting access is included in a list of particular TLDs (also referred to herein as the list of "higher trust" TLDs). As will be described in more detail below, if a given TLD is included in the list, policy engine 208 determines an appropriate policy to be applied and enforces the policy.

In some embodiments, each of components 202-208 is included in the browser application by the browser vendor. In other embodiments, elements such as policy engine 208 are provided by one or more third parties (e.g., as a plugin or extension). Whenever browser 104 is described as performing a task, either a single component or a subset of components or all components of browser 104 may cooperate to perform the task. Similarly, whenever a component of browser 104 is described as performing a task, a subcomponent may perform the task and/or the component may perform the task in conjunction with other components.

Figure 3:
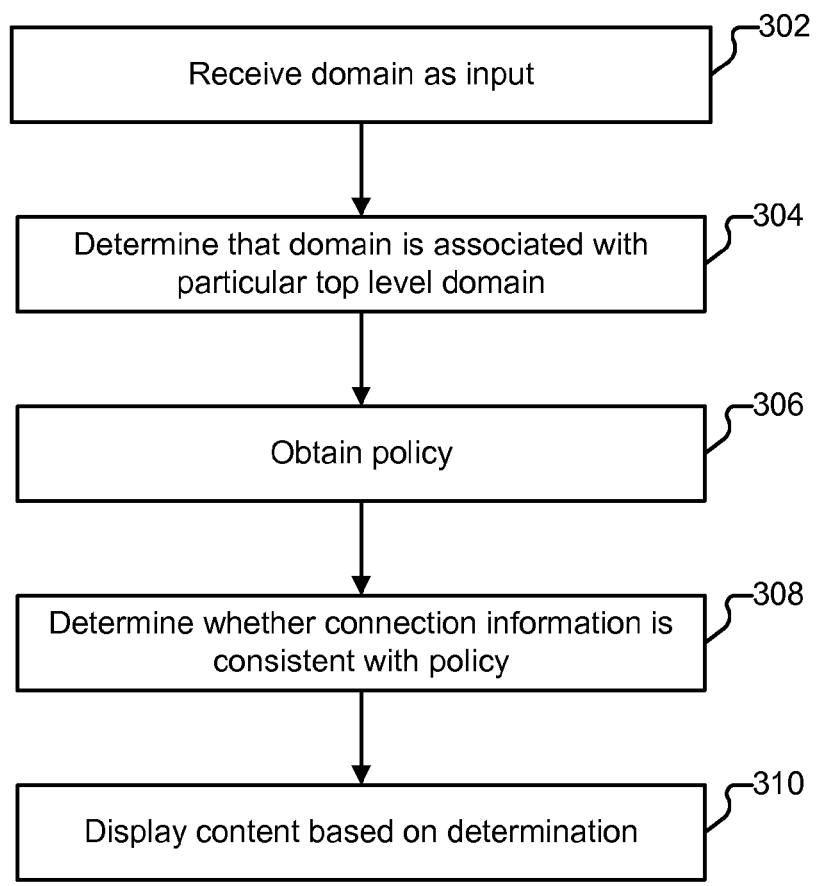
FIG. 3 illustrates an embodiment of a process for determining whether connection information is consistent with a policy.

FIG. 3 illustrates an embodiment of a process for determining whether connection information is consistent with a policy. In some embodiments process 300 is performed by browser 104. A more detailed process for determining whether connection is consistent with a policy is presented in FIG. 7 and described in more detail below.

Process 300 begins at 302 when a domain is received as input. As one example, the domain "www.acmebank.secure" is received as input at 302 when Alice types the address into the address bar in her browser. As another example, a domain is received as input as a result of a redirect (described in more detail below). As yet another example, a domain is received as input when Alice clicks on a hyperlink rendered in graphical user interface (GUI) 202 by rendering engine 206.

At 304, a determination is made that the domain is associated with a particular TLD. As one example, a determination is made that "www.acmebank.secure" is associated with the TLD, ".secure," which appears in the list of higher trust TLDs stored by browser 104.

At 306, a policy is obtained. As one example, the policy is obtained from a nameserver, such as nameserver 124 or nameserver 126, as a DNS request described in more detail below. As another example, one or more default policies 210 (also referred to herein as "base policies") are stored by browser 104 and an appropriate default policy is selected at 306. In some embodiments, browser 104 includes a policy database 212 (e.g., of cached policies previously obtained at 306 during other iterations of process 300). If an applicable policy is present in database 212, such a policy can be obtained at 306 as appropriate. As will be described in more detail below, the policy obtained at 306 can also be computed, such as by combining a policy received from nameserver 124 with default policy 210 to form a resultant policy. Also as will be explained in more detail below, different TLDs appearing in the browser's higher trust TLD list can have policies of varying stringency associated with them, respectively.

At 308, a determination is made as to whether connection information is consistent with the policy obtained at 306. As one example, the policy obtained at 306 can require that responses to DNS queries for domains under the ".secure" TLD be signed using DNSSEC. When Alice's browser 104 attempts to connect to www.acmebank.secure, policy engine 208 can determine whether the DNS resolution process makes use of the appropriate signatures. Requirements for other aspects of the connection can also be specified in the policy, as explained in more detail below in the section titled "Domain Policy Language."

At 310, content is displayed based on the determination performed at 308. Various examples of such content being displayed are depicted in FIGS. 4A, 4B, and 5.

Figure 4A:
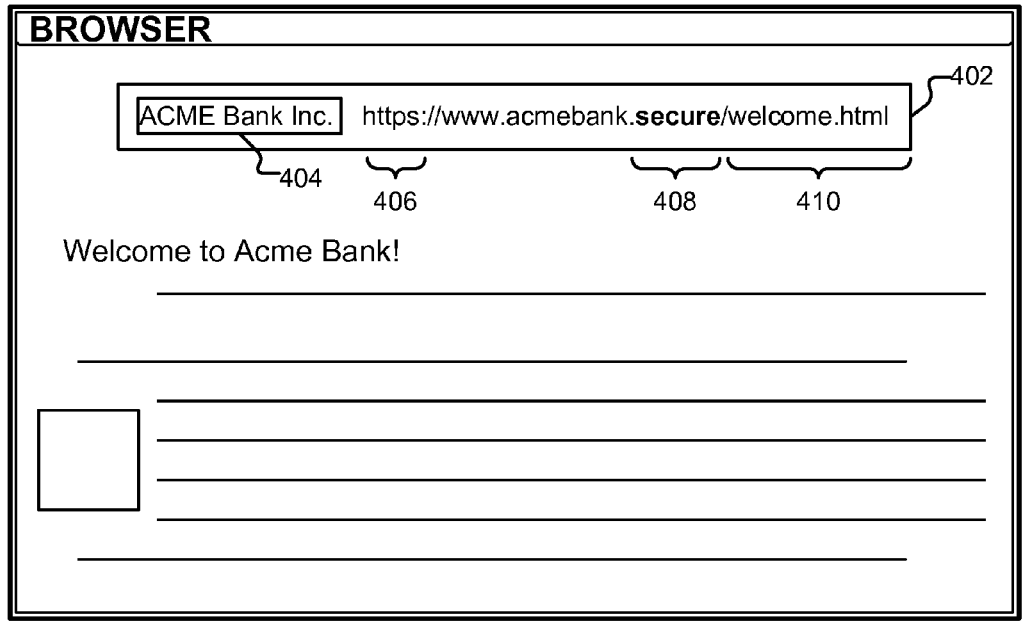
FIG. 4A illustrates an embodiment of content as rendered in a browser.

FIG. 4A depicts the main page of ACME Bank's website, as rendered by browser 104 in some embodiments. In the example shown, the address bar 402 displays information that allows Alice to see that she has securely connected with ACME Bank (i.e., information about her connection with website 128 is consistent with that required by a policy). As one example, the name of the legal entity that registered the domain ("ACME Bank Inc.") is displayed in region 404, in green, and outlined in a box. As another example, also indicated in green is the fact that HTTPS is being used (406). As yet another example, the TLD ".secure" is rendered in bold (408)—different from the rest of the URI. As yet another example, the specific page is greyed out (410).

Figure 4B:
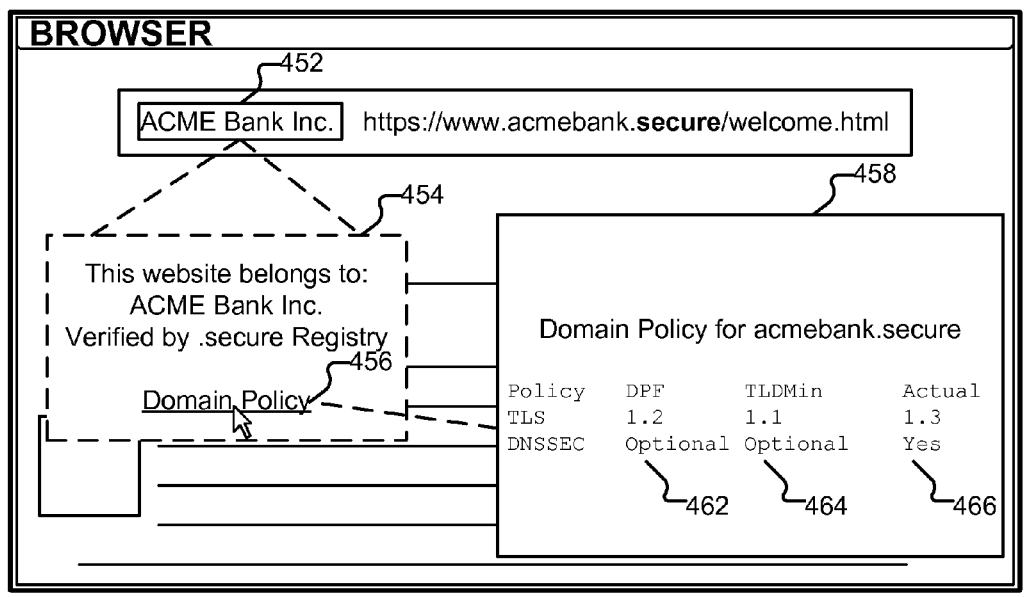
FIG. 4B illustrates an embodiment of content as rendered in a browser.

FIG. 4B depicts the interface shown in FIG. 4A as it is being interacted with by a user. In the example shown, Alice has hovered her mouse over region 452, resulting in overlay 454 being rendered in the browser window. Other interactions can also cause the content shown in region 454 to be displayed, such as by Alice clicking on region 452 or selecting an appropriate menu option (not shown) such as "tell me more about this site." Box 454 provides additional information about the registration of the site. If Alice hovers her mouse over region 456 (or clicks on it, as applicable), overlay 458 will be rendered in her browser. Box 458 shows that policies with respect to two aspects of a connection to website 128 have been specified—policies with respect to the version of TLS and policies with respect to whether or not DNSSEC is used. Column 464 lists the minimum requirements for any site in the .secure TLD (in some embodiments). Specifically, TLS version 1.1 or higher must be used, and use of DNSSEC is optional. Column 462 lists the minimum requirements for the acmebank.secure secondary level domain and any subdomains. The acmebank requirement for TLS is more stringent (1.2 or higher) but the DNSSEC requirement is the same as the minimum for all sites under the .secure TLD. Finally, column 466 shows the actual connection information with respect to the page Alice rendered: TLS 1.3 was used, as was DNSSEC. Alice's connection with site 128 was consistent with the requirements of both the TLD minimum (464) and the acmebank.secure minimum (462), and thus a resultant policy combining the two.

Figure 5:
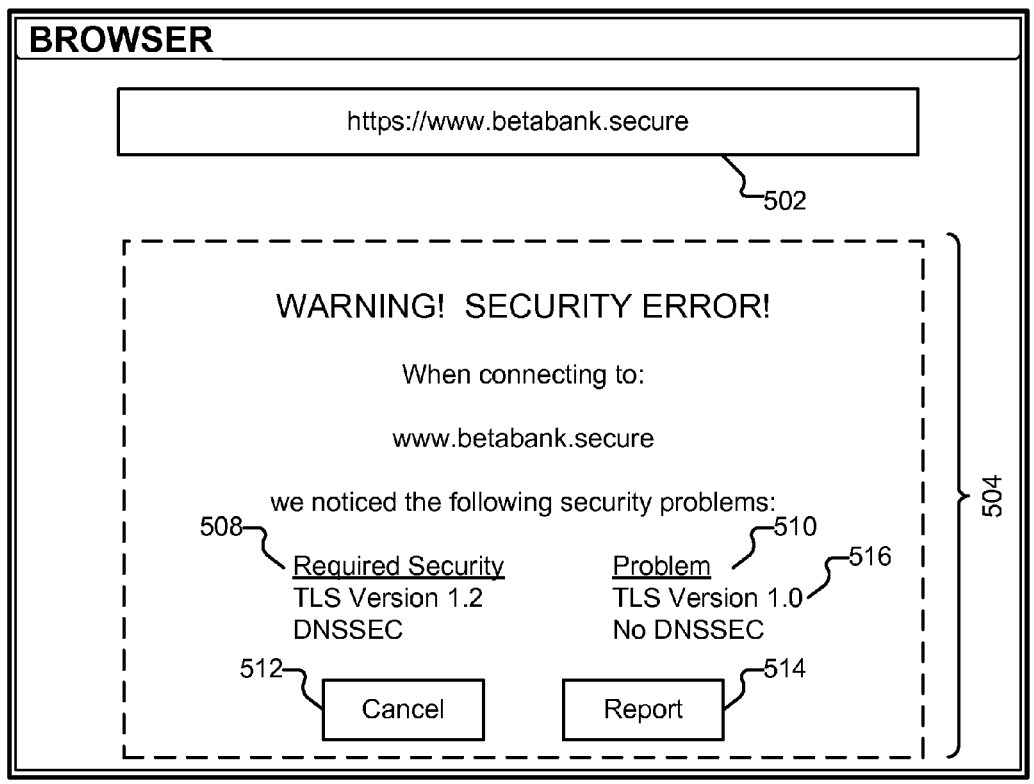
FIG. 5 illustrates an embodiment of content as rendered in a browser.

FIG. 5 depicts an embodiment of a website as rendered by browser 104 in some embodiments. In the example shown, the website of another bank, "Beta Bank," is either misconfigured or has been compromised. For the example depicted in FIG. 5, suppose the default policy for the .secure TLD requires TLS version 1.2 or higher and requires DNSSEC. Neither of these aspects is true with respect to the "Beta Bank" site. Instead, the site supports only TLS version 1.0 and DNSSEC is not used to resolve its IP address. In contrast to what is depicted in address bar 402, a viewer of interface 500 would see the URI rendered in red in address bar 502, because the browser is in an error state. Further, security warning 504 is provided (e.g., as a popup or inband) by the browser application. Included in the error notification are the policy requirements (508) and the observed connection information (510). Further, the user is able to learn more about the problem by clicking on that problem (e.g., by clicking item 516). The user is also presented with the option to navigate away from the page (by selecting cancel button 512) or to submit a report (e.g., to the registrar of the website) by selecting button 514. As illustrated in interface 500, the user is not presented with an "ignore"/"continue anyway" option, and the content of the Beta Bank website is not displayed to or accessible to the user. In some embodiments, the only way to be presented with an "ignore" option is for the user to run the browser in a debug mode, modify a registry key, or take another action unlikely to be taken by a typical end user.

Domain Policy Language

Overview

Top level (and second level/sub domains, as applicable) can communicate policies to applications such as applications 104 and 106 using the Domain Policy Framework (DPF). In some embodiments the DPF uses the DNS system to publish policies. As one example, the record itself can be extended to support the inclusion of additional information. As another example, DPF policies (also referred to herein as "records") can be separately stored in reserved zones under the control of participating TLDs. For a domain of pattern domain.tld, the domain policy would be stored as a TXT record for domain._policy.tld. For the example domain of www.acmebank.secure, the DPF record would thus be stored under www.acmebank._policy.secure. The use of the "_policy" second level domain (or other appropriate domain) allows for the deployment of DPF without ICANN's permission. It also forces TLD registries to use alternate DNS secondaries to publish the _policy zone. TLD registries can also publish a blank policy using only the DPFv entry. This will provide maximum compatibility and allow for DPF records to be published by the incumbent TLDs.

A DPF aware client, such as browser application 104, examines the domains it receives as input (e.g., at 302 in process 300) and looks up the TLD in its table. If the TLD is present in the table, it makes two parallel DNS requests, one for the host (www.acmebank.secure) and one for the policy (www.acmebank._policy.secure). DPF TXT records are cached throughout the DNS system in parallel to their associated host records.

Example Syntax

The following is one example of a syntax for properly formatted DPF records. The example syntax is human readable and can be modified or adapted as applicable. A DPF record contains a list of name value pairs bonded by the ASCII=sign. The pairs are separated by semi-colons with an optional trailing whitespace. As an example:

(1) name1=value1; name2=value2; name3=value3;

In example (1), an optional space is present between the second and third pairs, and the semi-colon is present behind the final pair.

The DPF record begins with a version field:

(2) DPFv=1

The other name value pairs can be in any order, and any tokenizing is insensitive to the order of values.

The characters in the name fields and the separating characters are encoded as 7-bit ASCII. Except for the organization identification field, all of the characters in the value field are also encoded as 7-bit ASCII. Interpretation of all fields is case insensitive, but case sensitivity can be preserved (e.g., for characters in free text fields) in situations where the value is displayed to a user. Names may be of length of up to eight consecutive alphanumeric characters. Values can be of the following four types:

Booleans: Encoded as a 1 for TRUE and 0 for FALSE. No other values are valid in a Boolean.

Integers: A 32-bit unsigned integer value between 0 and $2^{32-1}$, expressed in BASE10 using ASCII Arabic numerals.

BASE64 Encoded

Free Text Fields: Free text delimited by ASCII double quote characters. A free text field can contain upper-case alphabetical, lower-case alphabetical, and numeric characters. Some special characters are allowed, such as space and underscore.

DPF Entries

A name-value pair for which the value is of either the Boolean or Integer type is also referred to herein as a "DPF entry." DPF entries correspond to a single security action that can be taken by a DPF client. Boolean TRUE values are more secure than FALSE values. Integer entries increase in value as the expected security benefit increases. In situations where future intermediate values may be necessary, values can be reserved for future use.

A set of DPF entries published by a domain is also referred to herein as a "DPF policy." DPF versions are iterative, and the meanings of entry names assigned in previous versions are not modified by subsequent versions.

Entries can exist for many types of protocols (e.g., HTTP, SMTP), and such entries can be mixed together in shared policies. Clients are configured to ignore any entries that they do not understand, and continue to implement the entries they do understand. The following are tables of example DPF entries.

TABLE 1

Example Network and Identity Entries:

| Entry Name | Value Type | Description | Examples |
|---|---|---|---|
| DPFv | Integer | DPF version. | DPFv=1: DPF version 1. |
| DNSSEC | Integer | Level of DNSSEC verification required to connect to a host in this domain. This value is typically in use as a base entry included in a DPF client. | DNSSEC=0: Zone not signed, allow for DPF updates using unsigned records. DNSSEC=1: Zone is signed. Upon failure of DNSSEC verification, retry with built in resolver. Allow for insecure DPF and allow connection to proceed. DNSSEC=2: Zone is signed, attempt to re-request. Do not allow for insecure DPF, allow for connection to proceed. DNSSEC=3: Zone is signed, attempt to re-request. Do not allow for insecure DPF, do not allow for connection after DNSSEC failure. |

TABLE 1-continued

Example Network and Identity Entries:

| Entry Name | Value Type | Description | Examples |
|---|---|---|---|
| ORG | Text | A text field containing the verified identity of the domain owner. Supports I18N and alternate character sets. | ORG="ACME Bank Inc." |
| ORGV | Integer | The level of verification performed by the registry on the organization's identity. Higher values indicate a greater level of verification. This value is surfaced by the DPF client to the end-user via a UX mechanism. | ORGV=0: No verification performed. Self-identified. ORGV=2: Personal identification of an individual. ORGV=5: Strong enterprise verification, equal to or better than Extended Validation Certificates. |

TABLE 2

Example Email Related Entries:

| Entry Name | Value Type | Description | Examples |
|---|---|---|---|
| STLS | Integer | Type of TLS protection provided at the mail exchanger. | STLS=0: No TLS required. STLS=1: STARTTLS supported on normal SMTP Port. STLS=2: "Wrapped" SMTPS available on port 587. |
| STLSv | Integer | Minimum required TLS version. | STLSv=12: TLS 1.2 minimum. |
| NOEURI | Boolean | Are valid URIs allowed in emails from this domain? | NOEURI=0: URIs are allowed. NOEURI=1: URIs are not allowed, reject messages containing URIs. |
| ESIG | Text | Expected email signature algorithm for messages received from this domain. | ESIG="": No signatures expected. ESIG="SMIME3": Expect mail signed with SMIME v3 (RFC 2663). ESIG="OPGP": Expect mail signed with OpenPGP (RFC 4880). |
| DKIM | Boolean | Is DKIM enabled for this domain? | DKIM=1: Require DKIM on all mail received from this domain. |

TABLE 3

Example WWW Related Entries:

| Entry Name | Value Type | Description | Examples |
|---|---|---|---|
| HTLSv | Integer | Minimum required TLS version for initial HTTP connection. 0 means no TLS required. | HTLSv=0: No TLS required, connect using HTTP. HTLSv=13: TLS 1.3 required. Initially connect using HTTPS, reject all versions of TLS less than 1.3. |
| INCLD | Boolean | Are pages in this domain restricted from including content from non-TLS protected HTTP endpoints? | INCLD=0: Normal include policy. INCLD=1: Non-executable includes allowed over HTTP, such as images. INCLD=2: All includes must be served over HTTPS. INCLD=3: All includes must be served from this TLD. INCLD=4: All includes must be served from this exact domain. |
| TLSEV | Integer | Is an Extended Validation certificate required on servers in this domain? | TLSEV=0: No requirement for EV certificate. TLSEV=1: EV certificate or DNSSEC DANE published key. TLSEV=2: EV certificate always required. |

TABLE 3-continued

Example WWW Related Entries:

| Entry Name | Value Type | Description | Examples |
|---|---|---|---|
| 3CKIES | Boolean | Are third party cookies allowed to be set by sites running on this domain? | 3CKIES=0: Normal third-party cookie policy.<br>3CKIES=1: Do not allow third-party cookies. |
| NOPLGINS | Text | A text string containing plugins that are not allowed to run on this domain. | NOPLGINS="": Normal plugin policy.<br>NOPLGINS="FLASH;SILVERLIGHT;JAVA": No Flash, Silverlight or Java on this site.<br>NOPLGINS="ALL": No browser plugins allowed. |

Additional examples of content-oriented DPF entries include ones permitting or disallowing the use of iframes, JavaScript, and/or cross-domain includes in web pages rendered by browser 104, and requiring email messages to be rendered in plaintext only by mail client 106.

Base and Resultant Policies

As explained above, in some embodiments DPF policies are delivered via DNS. In situations where the DPF is intentionally blocked by an attacker, the DPF record is modified, and/or where there is an inadvertent failure of DNSSEC, end-users are still able to connect securely to the requested domain through the use of default policy 210. Each domain registry participating in the DPF can publish, out of band, the minimal requirements of their TLD. One example of a default policy 210 is as follows:

(3) DPFv=1; HTLS=12; DNSSEC=2; STLS=1

If browser 104 is not able to receive or validate a DPF record, the browser falls back on the default policy 210 accordingly. If the browser does receive a DPF record (e.g., via a DNS request to www.acmebank._policy.secure), in some embodiments it calculates a resultant policy. One way to determine a resultant policy is through the use of monotonically increasing values in order of security; the larger of the two values is used. As one example:

(4) Base Policy: DPFv=1; HTLS=12; DNSSEC=2; STLS=1;
(5) Received Policy: DPFv=2; HTLS=13; STLS=0;
(6) Resultant Policy: DPFv=2; HTLS=13; DNSSEC=2; STLS=1;

In some embodiments, resultant policies are cached in database policy database 212.

TLD Redirection

HTTP Strict Transport Security (HSTS) can be used by websites to signal to user-agents their desire to only be accessed using HTTPS. In some embodiments, HSTS is extended to perform an additional function: to allow for permanent redirects from one TLD (e.g., ".com") to another (e.g., ".secure").

Figure 6:
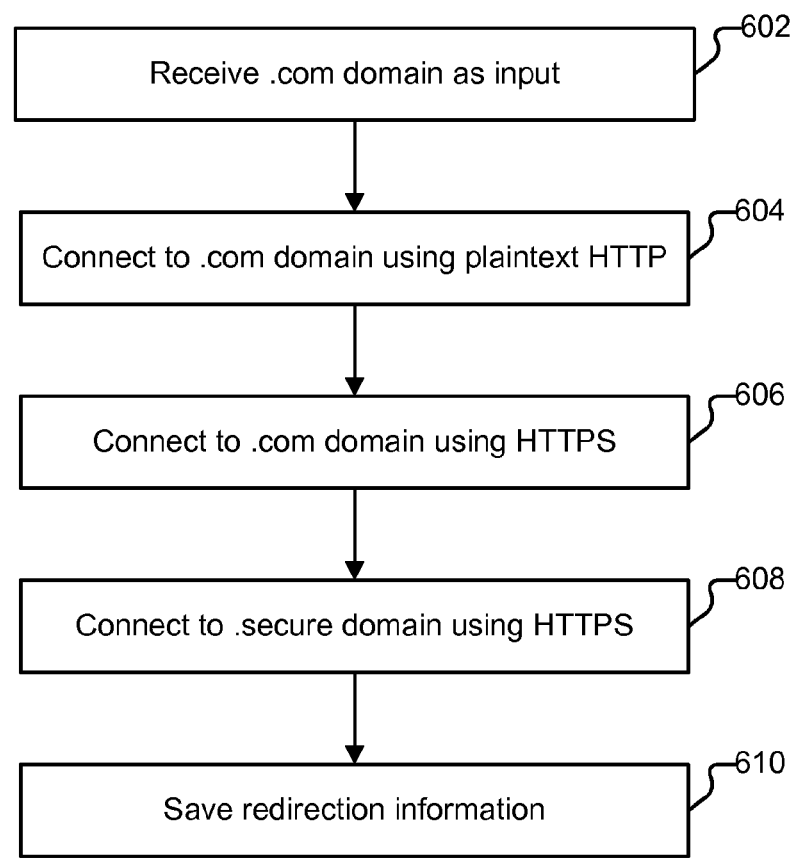
FIG. 6 illustrates an embodiment of a process for top level domain redirection.

FIG. 6 illustrates an embodiment of a process for top level domain redirection. In some embodiments the process shown in FIG. 6 is performed by browser 104. The process begins at 602 when a domain is received as input. As one example, Alice types "http://www.acmebank.com" into her address bar and the domain is received as input by browser 104 at 602.

At 604, the browser connects to www.acmebank.com using plaintext HTTP. The response from www.acmebank.com contains an instant 301 Redirect to https://www.acmebank.com, to which the browser connects at 606. The response from https://www.acmebank.com contains a 301 Redirect to https://www.acmebank.secure as well as the following HTTP header:

(7) Strict-Transport-Security: max-age=15768000; includeSubDomains; newTLD=secure;

At 608, the browser connects to www.acmebank.secure, and, at 610 caches the redirect in a local HSTS database. The next time Alice types "www.acmebank.com" into her address bar, browser 104 will automatically rewrite it as https://www.acmebank.secure and connect directly.

Figure 7:
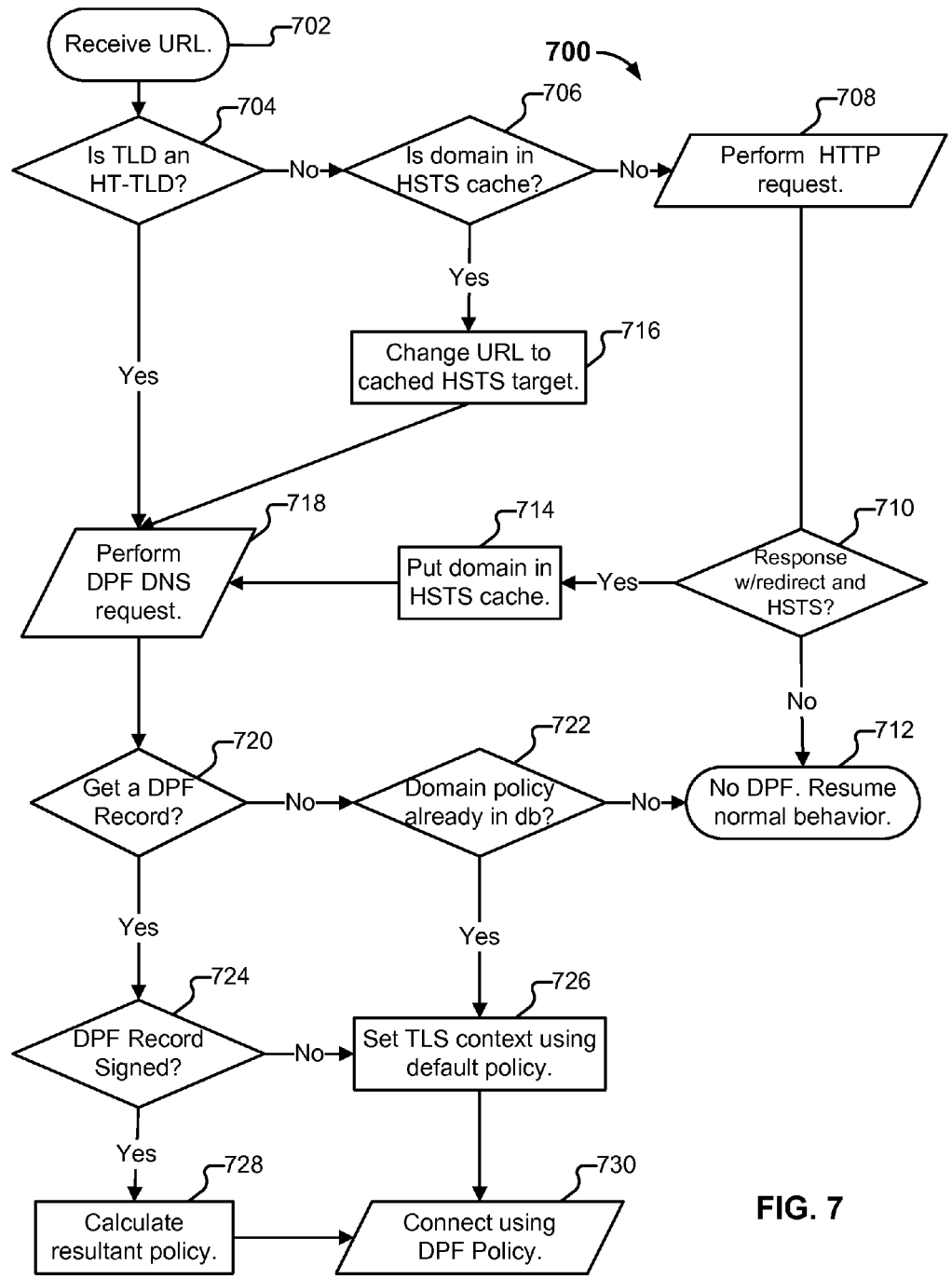
FIG. 7 illustrates an embodiment of a process for determining whether connection information is consistent with a policy.

FIG. 7 illustrates an embodiment of a process for determining whether connection information is consistent with a policy. In some embodiments process 700 is performed by browser 104.

Process 700 begins at 702 when a domain is received as input (e.g., "www.acmebank.com"). At 704 a determination is made as to whether or not the TLD (e.g., ".com") is in the browser's list of higher trust TLDs. Suppose that ".com" is not. At 706, a determination is made as to whether the domain is in the browser's HSTS cache. If not, at 708, an HTTP request is performed using the received domain. A determination (710) is made as to whether the response includes a redirect/HSTS. If it does not, traditional browser behavior is resumed (712). If the response does include a redirect/HSTS, the domain is added to the HSTS cache (714). If the domain is already in the HSTS cache, the received domain is rewritten at 716 (e.g., as "www.acmebank.secure").

At 718, a DNS request is performed for a DPF policy. As explained above, one way the request can be performed is by making a request for the TXT record stored at www.acmebank._policy.secure. At 720, a determination is made as to whether a DPF record is received. If a DPF record is not received, a determination is made (722) as to whether the domain policy is available locally (e.g., in policy database 212 or as a default policy 210). If the policy is locally available, or if a DPF record is received but is not properly signed (724), the default policy is used to set a TLS context (726). In some embodiments, if the DPF record is received but not properly signed, browser 104 is configured to perform a local resolve through the root zone.

If a DPF record is received, and is properly signed, a resultant policy is calculated at 728. Finally, at 730, a connection is established using the DPF policy.

Using Domain Policies in Email Delivery

Figure 8:
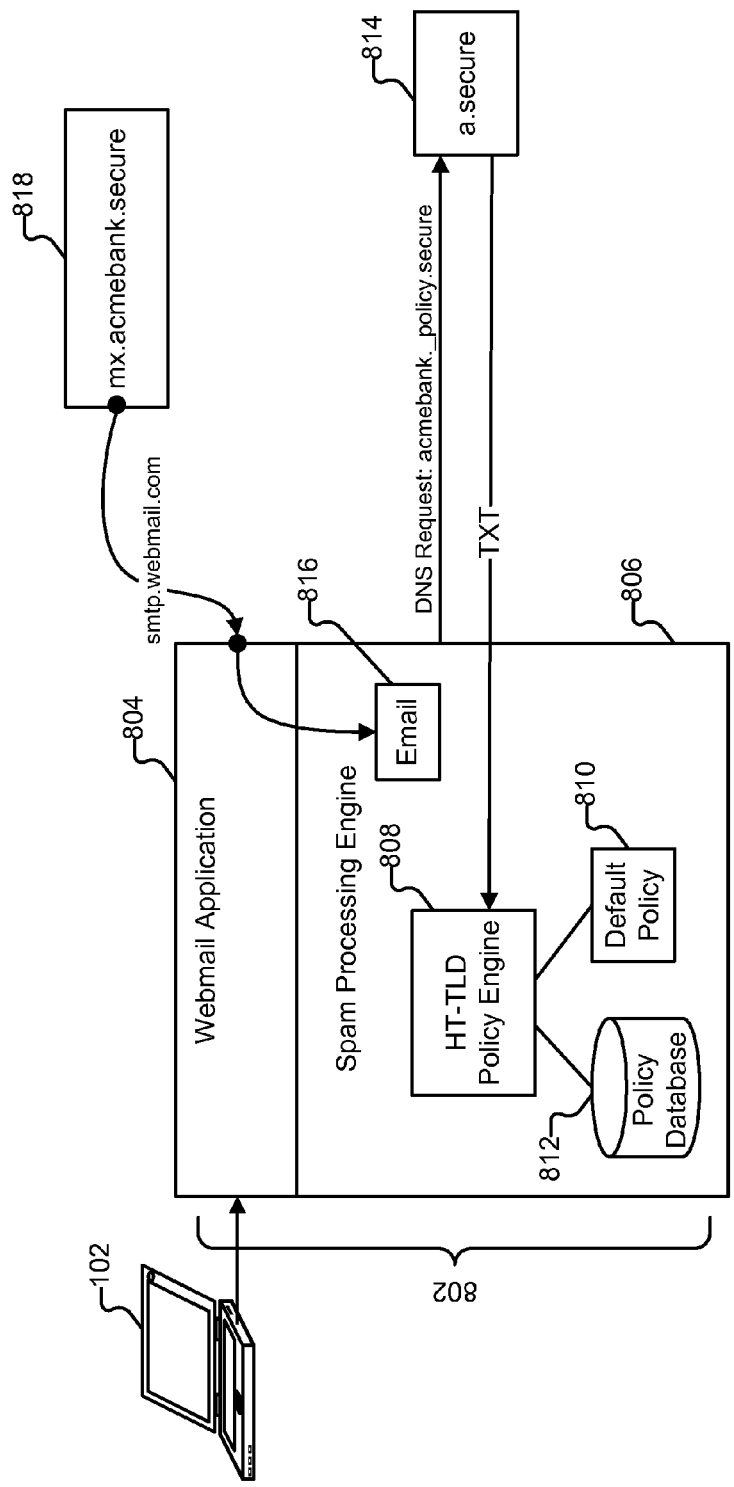
FIG. 8 illustrates an example of an environment in which domain policies are used in email delivery.

FIG. 8 illustrates an example of an environment in which domain policies are used in email delivery. In addition to banking with ACME Bank (via site 128), Alice also uses client 102 to access a web-based email service hosted by webmail system 802. Webmail system 802 comprises one or more commodity servers. Specifically, a webmail application 804 running on system 802 provides an interface (e.g., accessible via Alice's browser 104 at www.webmail.com) through which Alice can send and receive email messages. System

802 also includes a spam processing engine 806. Similar to browser 104, spam processing engine 806 includes a policy engine 808, one or more default policies 810, and a policy database 812, and has a list of higher trust TLDs. As will be described in more detail below, when system 802 receives an email message (e.g., addressed to Alice), the system examines the TLD of the sender of the message. If the TLD is included in the list, policy engine 808 determines an appropriate policy to be applied and enforces the policy with respect to acceptance (and/or delivery) of the message. In various embodiments, server 818 also includes a policy engine 808 and uses it in conjunction with sending messages (i.e., determining whether the recipient's TLD is included in a list, obtaining a policy via a DNS lookup, and applying the policy, such as only sending messages to servers that support TLS).

In some embodiments, each of components 208-212 is included within the spam processing engine by the vendor of the engine. In other embodiments, elements such as policy engine 808 are provided by one or more third parties (e.g., as a plugin or extension). Whenever system 802 is described as performing a task, either a single component or a subset of components or all components of system 802 may cooperate to perform the task. Similarly, whenever a component of system 802 is described as performing a task, a subcomponent may perform the task and/or the component may perform the task in conjunction with other components.

Figure 9:
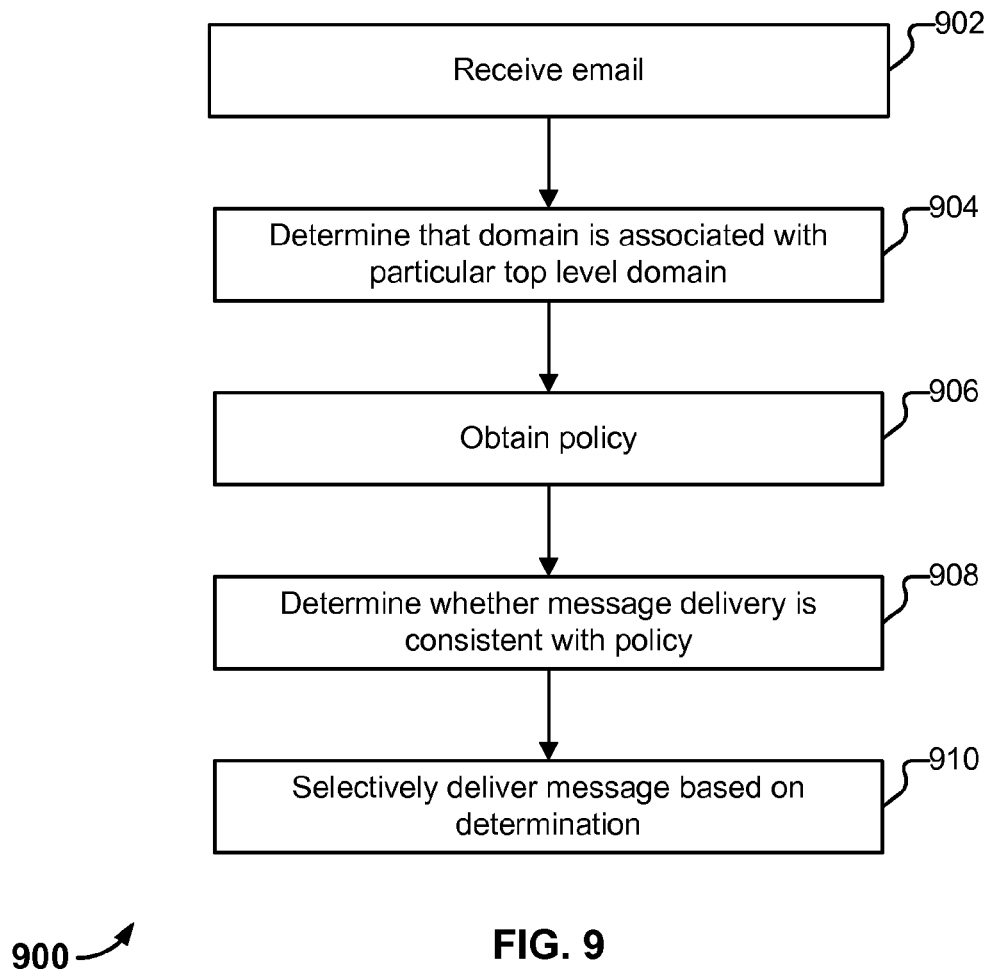
FIG. 9 illustrates an embodiment of a process for determining whether delivery of an email is consistent with a policy.

FIG. 9 illustrates an embodiment of a process for determining whether delivery of an email is consistent with a policy. In some embodiments process 900 is performed by system 802. A more detailed process for determining whether delivery of an email is consistent with a policy is presented in FIG. 10 and described in more detail below.

Process 900 begins at 902 when an email is received. As one example, suppose ACME Bank would legitimately like Alice to log into her bank account (e.g., to review a change in its privacy policies or to obtain tax documents). An administrator at ACME Bank (or an automated process) addresses an email to alice@webmail.com and causes the message to be sent. The message 816 is received by system 802 at 902.

At 904, a determination is made that the domain of the sender is associated with a particular TLD. As one example, a determination is made that "mx.acmebank.secure" (812) is associated with the TLD, ".secure," which appears in the list of higher trust TLDs stored by system 802.

At 906, a policy is obtained. As one example, the policy is obtained from a nameserver, such as nameserver 814. In particular, system 802 sends a DNS request for acmebank._policy.secure and receives back a TXT record. A single record for acmebank._policy.secure can be used to specify policies applicable to both connections made to website 128 and the treatment of email messages sent by server 818. As explained above, clients (e.g., browser 104 and, in this example, system 102) can be configured to ignore any entries in the policy that they do not understand, and implement the entries that they do understand. Thus, if the acmebank._policy.secure policy includes a DKIM entry, browser 104 can ignore it. Similarly, if the acmebank._policy.secure policy includes an entry applicable to FTP (e.g., requiring the use of SSL for FTP), system 802 can ignore that entry. As with browser 104, system 802 can also make use of a default policy 810, policy database 812, and the calculation of resultant policies (described above) in obtaining policies at 906.

At 908, a determination is made as to whether delivery of the message is consistent with the policy obtained at 906. As one example, the policy obtained at 906 can require that sever 818 make use of STARTTLS and that version 1.3 of TLS be used. If server 818 does not comply with the policy, the reason may be that server 818 is misconfigured. Server 818 may also not comply with the policy because, instead of being owned and maintained by ACME Bank, the server may be owned/operated by an imposter.

Finally, at 910, the message is selectively delivered based on the determination made at 908. As one example, if the transmission of the message complies with the policy requirements (e.g., regarding STARTTLS or DKIM), the message is delivered to Alice's inbox at 910. As explained above, some of the policy entries can be content-specific. So, for example, a policy entry could require that email messages be delivered in plaintext or that messages not contain any URLs. A policy entry could also require that any messages sent by server 818 be signed, encrypted, etc. If the policy is not satisfied, the message is not delivered to Alice. In some embodiments, the message is silently removed. A warning message or other notification can also be delivered to Alice in lieu of the message, as applicable, informing Alice that the message did not comply with the policy and letting her know the reason. As will be described in more detail below, additional processing can also be performed on the message prior to delivery, such as traditional antispam analysis.

Figure 10:
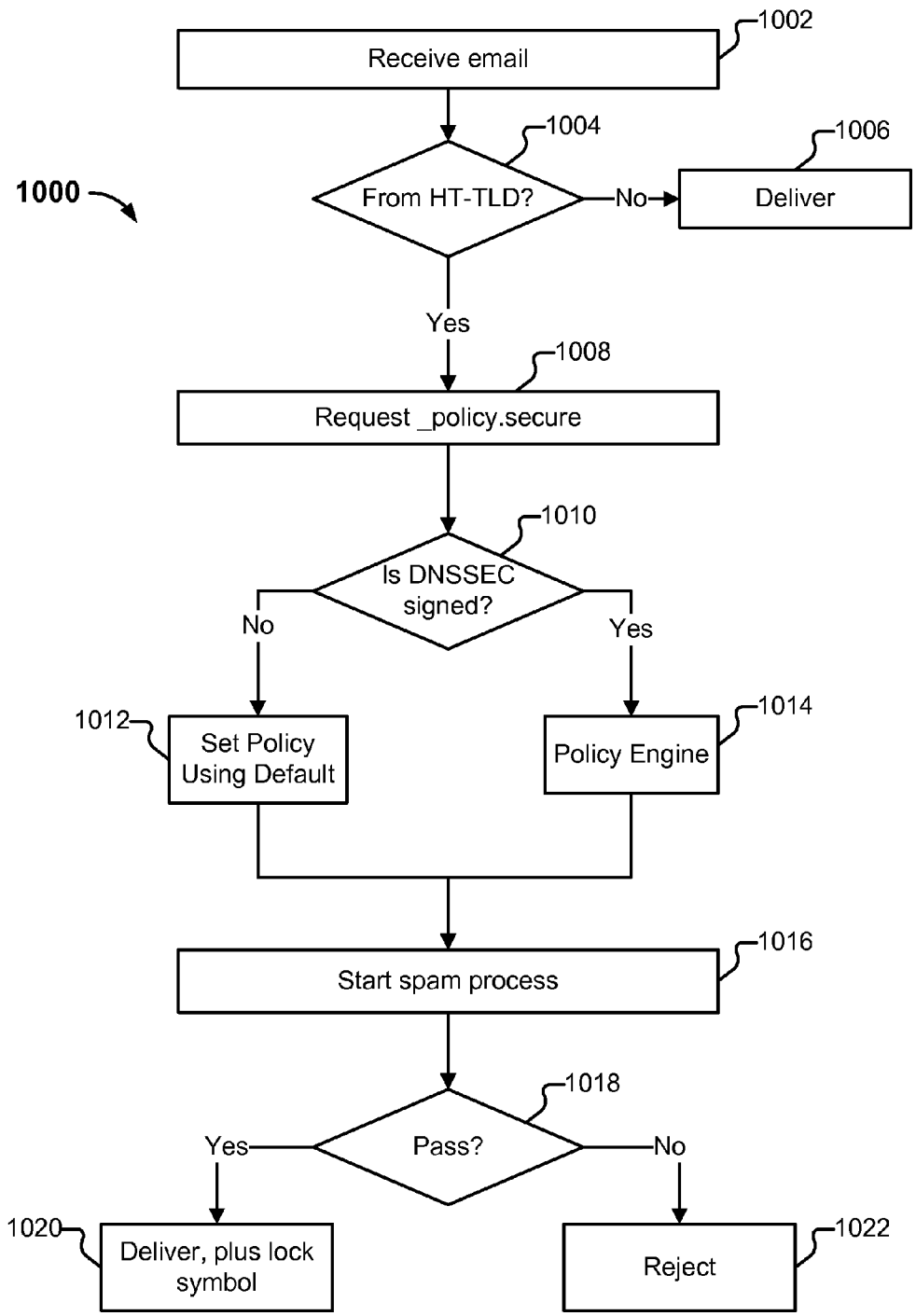
FIG. 10 illustrates an embodiment of a process for determining whether delivery of an email is consistent with a policy.

FIG. 10 illustrates an embodiment of a process for determining whether delivery of an email is consistent with a policy. In some embodiments process 1000 is performed by system 802.

Process 1000 begins at 1002 when an email message is received (e.g., a message to alice@webmail.com sent by server 818). At 1004 a determination is made as to whether or not the TLD (e.g., ".secure") is in the system's list of higher trust TLDs. If not, the message is delivered at 1006 (or traditional processing is performed prior to possible delivery).

Since ".secure" is in the list of higher trust TLDs, at 1008 a policy is requested (e.g., a DNS request for acmebank._policy.secure is sent by system 102). At 1010, the response is examined to see if it is DNSSEC signed. If the response is not appropriately signed, the local default policy 810 is used (1012). Other actions can also be taken in response to determining that the response is not DNSSEC signed, such as by system 102 performing a local resolve through the root zone. If the response is appropriately signed (1014), the policy will be used (or, a resultant policy is computed using the received policy and the default policy).

At 1016, the message is evaluated using both traditional antispam analysis, and also for compliance with the selected DPF policy. Policy engine 808 and any additional analyzers/engines can run in parallel or in series in determining whether the message "passes" all requirements for delivery (1018). If the message satisfies all requirements for delivery (e.g., its delivery does not violate the policy) the message is delivered at 1020. Otherwise (1022), the message is rejected.

In some embodiments, an indication that the message was sent by a domain associated with a higher trust TLD, that the message complied with a DPF record, etc. is presented to the user when the user accesses the message. For example, the ".secure" portion of the sender's email address (e.g., admin@acmebank.secure) can be rendered by webmail application 804 in bold. As another example, the legal name of the sender ("ACME Bank Inc.") can be substituted for the domain portion of the email address when rendered by webmail application 804 to Alice. As yet another example, a lock symbol can be presented to the user in an inbox view; messages which have been verified can be bolded in an inbox view; etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a set of one or more interfaces configured to:
   receive input including a second level domain, wherein the second level domain is associated with a particular top level domain; and
   obtain a policy associated with the top level domain, wherein the policy includes at least one requirement regarding Domain Name System Security Extensions (DNSSEC);
   a processor configured to:
   determine whether connection information is consistent with the policy, wherein the at least one requirement includes a requirement that a Domain Name System (DNS) response associated with the connection be DNSSEC signed and wherein the system is configured to send a second request in response to a determination that the response is not signed; and
   display content based on the determination; and
   a memory coupled to the processor and configured to provide the processor with instructions.

2. The system of claim 1 wherein the policy comprises a default security policy.

3. The system of claim 1 wherein determining whether the connection information is consistent with the policy is performed by a browser application executing on the system.

4. The system of claim 1 wherein the policy includes a requirement regarding a version of Transport Layer Security (TLS).

5. The system of claim 1 wherein the policy includes a requirement regarding an Extended Validation (EV) Certificate.

6. The system of claim 1 wherein the policy includes a requirement regarding the presence of an iframe.

7. The system of claim 1 wherein the policy includes a requirement regarding the presence of a cross-domain include.

8. The system of claim 1 wherein the displayed content includes at least one indicator rendered in a browser address bar.

9. The system of claim 8 wherein the indicator comprises a corporate name.

10. The system of claim 8 wherein the indicator comprises the top level domain being rendered in a manner different from the second level domain.

11. The system of claim 1 wherein obtaining the policy includes determining a resultant policy from a base policy and a received policy.

12. The system of claim 1 wherein the content displayed comprises an indication that the connection is secure.

13. The system of claim 1 wherein the content displayed comprises an error message in the event it is determined that the connection information is not consistent with the policy.

14. The system of claim 1 wherein the processor is further configured to rewrite the input at least in part by substituting a second top level domain for a first top level domain.

15. The system of claim 1 wherein the interface is configured to obtain the policy from an external source.

16. The system of claim 15 wherein obtaining the policy includes transforming the received input into a transformed domain.

17. A method, comprising:
   receiving input including a second level domain, wherein the second level domain is associated with a particular top level domain;
   obtaining a policy associated with the top level domain, wherein the policy includes at least one requirement regarding Domain Name System Security Extensions (DNSSEC);
   determining whether connection information is consistent with the policy, wherein the at least one requirement includes a requirement that a Domain Name System (DNS) response associated with the connection be DNSSEC signed and wherein the system is configured to send a second request in response to a determination that the response is not signed; and
   displaying content based on the determination.

18. The method of claim 17 wherein determining whether the connection information is consistent with the policy is performed by a browser application.

19. The method of claim 17 wherein the displayed content includes at least one indicator rendered in a browser address bar.

20. A computer program product embodied in a tangible non-transitory computer readable storage medium and comprising computer instructions for:
   receiving input including a second level domain, wherein the second level domain is associated with a particular top level domain;
   obtaining a policy associated with the top level domain, wherein the policy includes at least one requirement regarding Domain Name System Security Extensions (DNSSEC);
   determining whether connection information is consistent with the policy, wherein the at least one requirement includes a requirement that a Domain Name System (DNS) response associated with the connection be DNSSEC signed and wherein the system is configured to send a second request in response to a determination that the response is not signed; and
   displaying content based on the determination.

* * * * *